United States Patent
Goncalves et al.

(10) Patent No.: US 10,797,577 B2
(45) Date of Patent: Oct. 6, 2020

(54) PRIMARY ELEMENT OF AN IRONLESS LINEAR MOTOR

(71) Applicant: ETEL S.A., Motiers (CH)

(72) Inventors: Jose Manuel Fernandes Goncalves, Colombier (CH); Sylwia Szczukiewicz, Lausanne (CH)

(73) Assignee: ETEL S.A., Motiers (CH)

( * ) Notice: Subject to any disclaimer, the term of this patent is extended or adjusted under 35 U.S.C. 154(b) by 381 days.

(21) Appl. No.: 15/617,036

(22) Filed: Jun. 8, 2017

(65) Prior Publication Data
US 2017/0373579 A1    Dec. 28, 2017

(30) Foreign Application Priority Data

Jun. 28, 2016 (EP) ..................... 16176655

(51) Int. Cl.
| | |
|---|---|
| *H02K 41/02* | (2006.01) |
| *H02K 9/22* | (2006.01) |
| *H02K 9/19* | (2006.01) |
| *H02K 3/47* | (2006.01) |
| *H02K 5/20* | (2006.01) |

(52) U.S. Cl.
CPC ............... *H02K 41/02* (2013.01); *H02K 3/47* (2013.01); *H02K 5/20* (2013.01); *H02K 9/19* (2013.01); *H02K 9/22* (2013.01)

(58) Field of Classification Search
CPC ............ H02K 3/47; H02K 41/02; H02K 5/20; H02K 9/19; H02K 9/22
See application file for complete search history.

(56) References Cited

U.S. PATENT DOCUMENTS

| | | |
|---|---|---|
| 5,998,889 A | 12/1999 | Novak |
| 9,178,401 B2 | 11/2015 | Sugita et al. |
| 9,325,223 B2 | 4/2016 | Shinohira et al. |
| 2009/0315414 A1 | 12/2009 | Shikayama et al. |
| 2011/0181130 A1* | 7/2011 | Yoshida ............... H02K 41/031 310/12.29 |
| 2012/0049658 A1* | 3/2012 | Yoshida ................... H02K 3/24 310/12.29 |
| 2012/0062866 A1* | 3/2012 | Binnard .................. H02K 9/22 355/72 |
| 2013/0257182 A1 | 10/2013 | Shinohira et al. |
| 2014/0054979 A1 | 2/2014 | Sugita et al. |

(Continued)

FOREIGN PATENT DOCUMENTS

| | | |
|---|---|---|
| CN | 101657956 A | 2/2010 |
| CN | 102136787 A | 7/2011 |

(Continued)

*Primary Examiner* — Bernard Rojas
(74) *Attorney, Agent, or Firm* — Leydig, Voit & Mayer Ltd.

(57) ABSTRACT

A primary element of an ironless linear motor include cooling plates. Each of the cooling plates is connected to a connecting piece extending in a region of an edge of the cooling plate. The connecting pieces are configured to supply coolant. The connecting pieces are located one above the other in a direction perpendicular to the cooling plates so as to form a common connecting region of the cooling plates at an end face of the primary element. A plurality of coils are disposed between the cooling plates. A coolant distribution header is releasably attached to the connecting region.

21 Claims, 4 Drawing Sheets

(56) References Cited

U.S. PATENT DOCUMENTS

| | | | |
|---|---|---|---|
| 2015/0162812 A1 | 6/2015 | Da Conceição Rosa | |
| 2016/0102928 A1 | 4/2016 | Da Conceição Rosa | |
| 2018/0138783 A1* | 5/2018 | Taborelli | H02K 9/10 |
| 2019/0006902 A1* | 1/2019 | Fernandes Goncalves | H02K 15/061 |

FOREIGN PATENT DOCUMENTS

| | | |
|---|---|---|
| CN | 103633811 A | 3/2014 |
| EP | 2645546 A2 | 10/2013 |
| EP | 2701292 A2 | 2/2014 |
| EP | 2808986 A1 | 12/2014 |
| EP | 2884638 A1 | 6/2015 |

* cited by examiner

PRIMARY ELEMENT OF AN IRONLESS LINEAR MOTOR

CROSS-REFERENCE TO PRIOR APPLICATION

Priority is claimed to European Patent Application No. EP 16176655.5, filed on Jun. 28, 2016, the entire disclosure of which is hereby incorporated by reference herein.

FIELD

The present invention relates to a primary element of an ironless linear motor and a linear motor having such a primary element. Such linear motors have advantages in applications which require highly accurate positioning, because by dispensing with an iron core in the primary element, disturbing cogging forces are avoided. However, to be able to produce high forces even without an iron core, the coil currents need to be as high as possible, which can only be achieved with effective cooling of the coils.

BACKGROUND

U.S. Pat. No. 5,998,889 describes positioning the coils of an ironless linear motor between two cooling plates, through each of which a coolant is circulated. To this end, each of the cooling plates is connected to a connecting piece for supply of coolant, the connecting piece extending in the region of an edge of the cooling plate. However, such a primary element is quite complex to assemble and manufacture because the connecting pieces are disposed at opposite ends of the primary element, and thus separate coolant supply and discharge lines have to be connected.

SUMMARY

In an embodiment, the present invention provides a primary element of an ironless linear motor. The primary element includes cooling plates. Each of the cooling plates is connected to a connecting piece extending in a region of an edge of the cooling plate. The connecting pieces are configured to supply coolant. The connecting pieces are located one above the other in a direction perpendicular to the cooling plates so as to form a common connecting region of the cooling plates at an end face of the primary element. A plurality of coils are disposed between the cooling plates. A coolant distribution header is releasably attached to the connecting region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a primary element for a linear motor which is particularly easy to install.

According to an embodiment, a primary element of an ironless linear motor has a plurality of coils disposed between cooling plates. Each cooling plate is connected to a connecting piece for supply of coolant, the connecting piece extending in the region of an edge of the cooling plate. The connecting pieces of the cooling plates are located one above the other in a direction perpendicular to the cooling plates, so that a common connecting region is created for the cooling plates at an end face of the primary element, a coolant distribution header being releasably attached to the connecting region.

Thus, the supply to and return from the primary element can be accomplished via a single supply line and a single discharge line for a coolant (e.g., water) by connecting these lines to the single distribution header. This distribution header thus performs the function of supplying coolant to the cooling plates and discharging it therefrom.

The distribution header and the corresponding holes for fastening screws and coolant channels are configured such that the distribution header can be attached in two different orientations. Preferably, the distribution header also facilitates assembly by means of a recess that receives the connecting pieces of the cooling plates; i.e., the connecting region thereof.

Each cooling plate is composed of two plates which are brazed together and provided with channels for coolant. The connecting pieces are also brazed to the cooling plates. Such brazed joints exhibit excellent long-term stability. Since the assembly formed by a cooling plate and a connecting piece can be very easily checked for tightness in advance, it is very unlikely for coolant to leak from these assemblies later. Leakage is more likely to occur in the region of the distribution header. However, in the event of a repair being necessary, the distribution header is easily accessible, allowing for easy replacement of sealing rings between the connecting pieces and the distribution header.

Other exemplary embodiments and advantages of the present invention will be described with reference to the figures.

Figure 1:
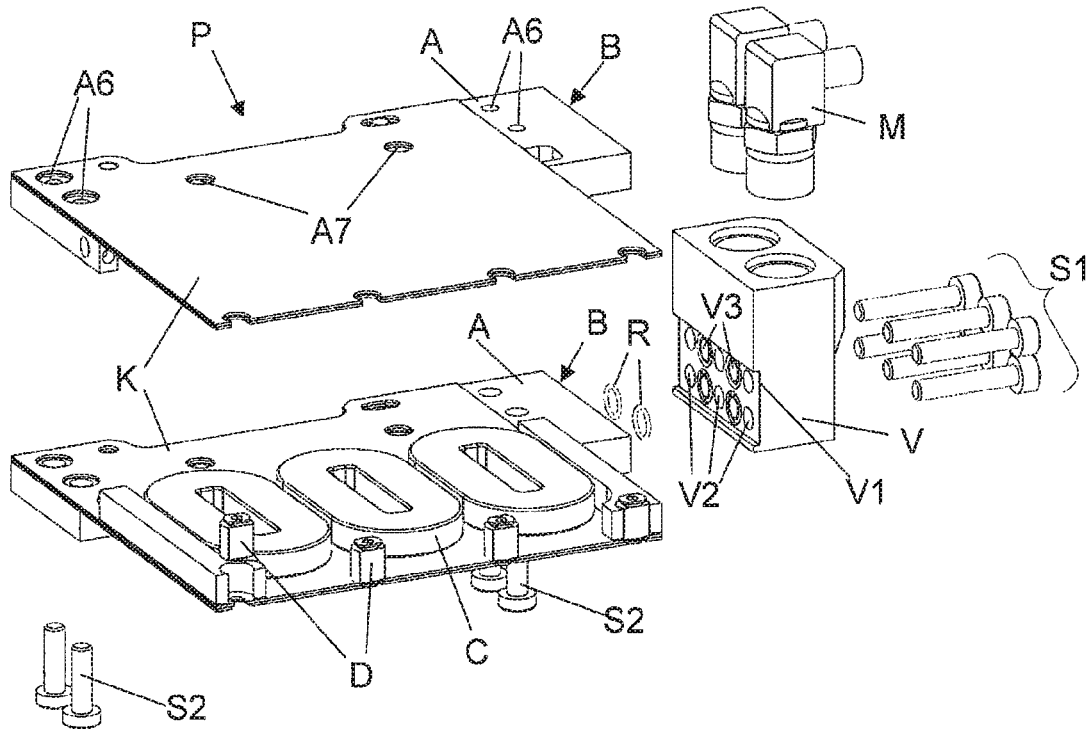
FIG. 1 shows an exploded view of a primary element.
Figure 2:
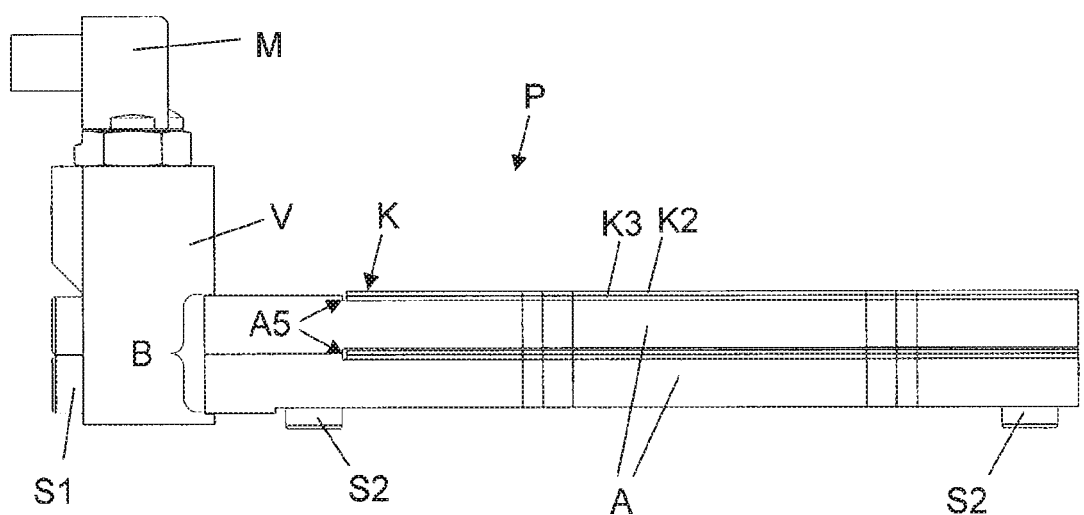
FIG. 2 shows a side view of the primary element.

FIG. 1 and FIG. 2 show a primary element P according to the present invention. The construction of primary element P can be seen particularly well in the exploded view of FIG. 1.

Three flat coils C are disposed between two cooling plates K of a non-magnetic stainless steel with their coil axes perpendicular to cooling plates K. Coils C are insulated from cooling plates K by a layer of a material having high dielectric strength, but good thermal conductivity, such as polyimide film. Since linear motors typically operate with three phases, three coils C, or integral multiples thereof, are present in primary element P. As mentioned above, the individual cooling plates K are each composed of two plates K2, K3 which are brazed together and provided with channels for coolant. Plates K2, K3 can be seen in the side view of FIG. 2. In each of the exemplary embodiments, two cooling plates K having a layer of coils C disposed therebetween are shown. A plurality of layers of coils C and a correspondingly larger number of cooling plates K arranged in a sandwich-like configuration are also possible.

Connecting pieces A are preferably also made from a non-magnetic stainless steel and are each brazed to a cooling plate K. These connecting pieces A extend along an edge of cooling plates K, and preferably along an edge oriented in the direction of movement of primary element P. Connecting pieces A connect the cooling channels in cooling plates K to a connecting region B, via which coolant can be supplied and discharged. Cooling plates K are located one above the other in a direction perpendicular to cooling plates K and are congruent with each other. The cooling channels etched or milled into the individual plates K2, K3 and located inside cooling plates K are equal (i.e., are preferably also congruent) and ensure that heat is removed from all coils C as efficiently as possible.

The connecting pieces A of both cooling plates K are disposed parallel to each other in such a way that a common connecting region B is formed at the end face of primary element P. This common connecting region B has coolant inlet and outlet openings for both cooling plates K, as well as threaded holes for mounting a distribution header V.

This distribution header V uniformly distributes the coolant to cooling plates K. For this purpose, it is provided with a plurality of coolant outlets and inlets V3, which are connected via sealing rings R to corresponding ports on connecting pieces A, as well as holes V2 through which fastening screws S1 are passed so as to be threaded into the corresponding threaded holes in connection pieces A. Each coolant port V3 has two screws S1 arranged adjacent thereto, so that a compressive force can be uniformly applied to sealing rings R.

Furthermore, distribution header V has a recess V1 configured to be able to accommodate the common connecting region B. This facilitates mounting of distribution header V, because the recess ensures that the coolant ports V3, sealing rings R and holes V2 of distribution header V are properly positioned relative to connecting region B of connecting pieces A.

Moreover, with regard to recess V1, holes V2 and coolant ports V3, distribution header V is configured such that it can be attached in two different orientations. Thus, two coolant connectors M can be brought thereto from two different sides, depending on the application.

FIG. 2 shows another advantageous feature of connecting pieces A. For manufacturing reasons, the thickness of cooling plates K (perpendicular to the cooling plate plane) is not particularly well defined and is subject to certain tolerances. Therefore, connecting pieces A are provided with a recess A5 having a depth which is, in any case, sufficient to accommodate the thickness of cooling plate K. A recess A5 may either accommodate half the thickness of cooling plate K if, as shown in FIG. 2, a corresponding recess A5 of another connecting piece A is located opposite thereto, or a recess A5 may accommodate the entire thickness of cooling plate K. Thus, the distance between the two cooling plates K is determined quite precisely by the thickness of connecting pieces A, and thus the exact thickness of cooling plates K is irrelevant for the outer dimension of primary element P. This is important because such primary elements P are typically guided as closely as possible along the secondary element (a magnet track including magnets of alternating polarity), or between two magnet tracks.

Figure 3:
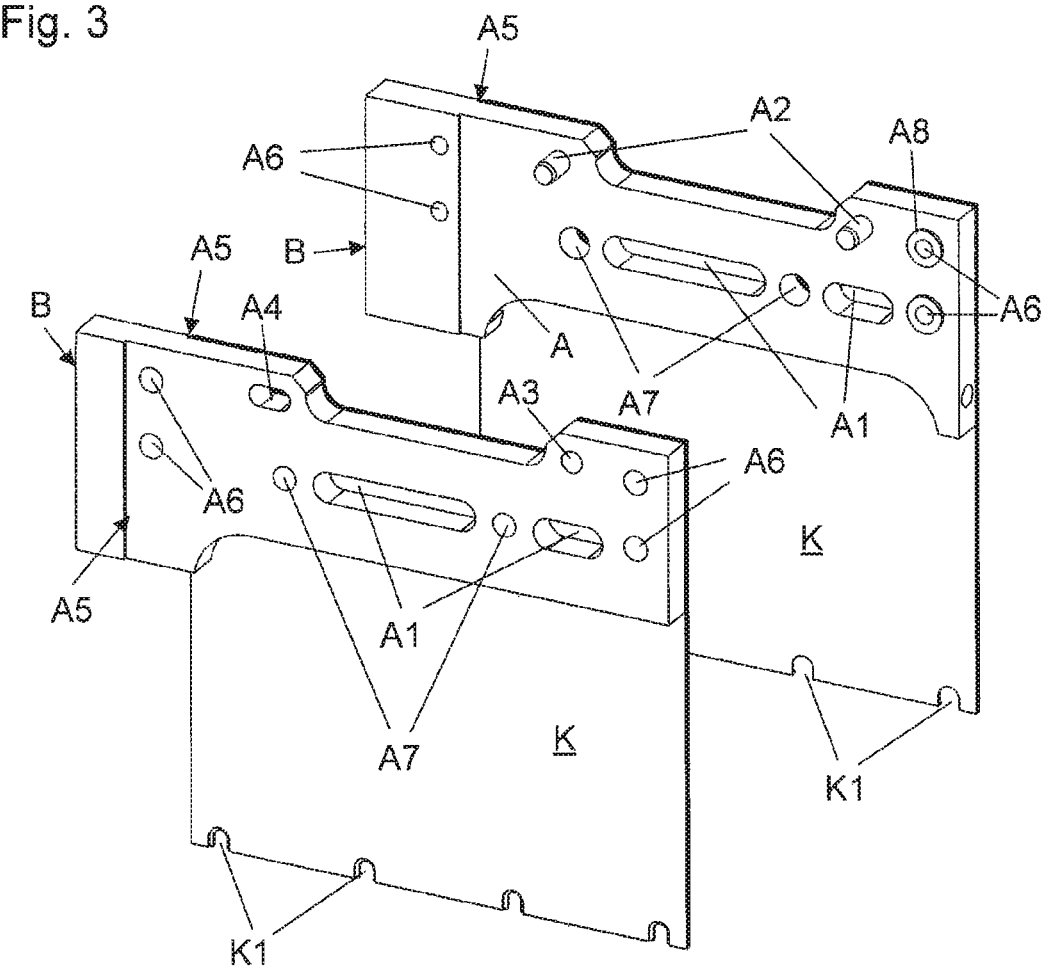
FIG. 3 shows two cooling plates with associated connecting pieces.

FIG. 3 shows only two cooling plates K and their connecting pieces A prior to assembly. Several details of these components will be discussed below.

The two connecting pieces A of FIG. 3 have corresponding features which facilitate the assembly of primary element P. First of all, it can be seen that connecting pieces A each have a recess A5 on both sides, so that, upon assembly, two of these recesses A5 provide sufficient space to accommodate a cooling plate K, even if the thickness thereof is at the upper end of the tolerance range.

Cylindrical projections A2 (e.g., pins pressed into corresponding holes) project from one of the two connecting pieces A and engage in corresponding openings A3, A4 in the other connecting piece A. In the exemplary embodiment shown, a hole A3 and a slotted hole A4 are provided for this purpose. Alternatively, it would also be possible to use two slotted holes to permit some freedom with respect to the positioning of connecting pieces A in order to compensate for manufacturing tolerances. This is useful especially for aligning the two connecting pieces A with respect to each other in region B, so that a common connection plane is created. Thus, initially, screws S1 for fastening distribution header V can be tightened, so that both connecting pieces A contact the distribution header in region B, and then screws S2 can be tightened to join connecting pieces A together.

Connecting pieces A each have four holes A6. One of each two holes A6 located one behind the other has a thread, so that the two connecting pieces A can be screwed together by the screws S2 shown in FIG. 1. Holes A6 which are located opposite connecting region B in the region of recess A5 are surrounded by a circular ridge A8 which sets the distance between connecting pieces A in this region, leaving the recess A5 for accommodating cooling plate K. Thus, cooling plate K is not clamped when tightening screws S2.

To permit attachment of primary element P, connecting pieces A each have two holes A7, which are located one above the other, one of each two holes containing a thread. This allows primary element P to be attached to a customer's application by means of screws from one side without the need to install nuts from the rear side. This facilitates mounting of primary element P under restricted space conditions.

Connecting pieces A further have milled therein pockets A1 for reducing the mass of primary element P.

In addition, cooling plates K are provided at the edges opposite the connecting pieces A with openings K1 for receiving spacers D. These spacers D and the installation thereof will be described in more detail below.

Figure 4:
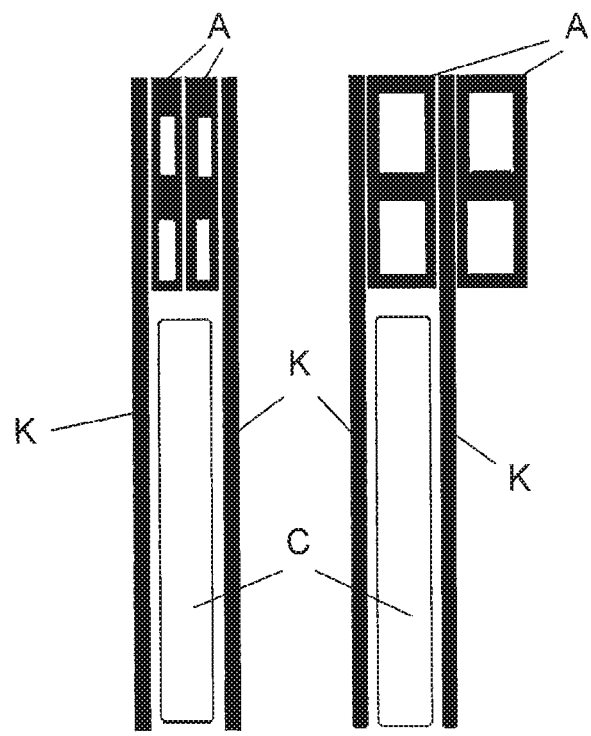
FIG. 4 shows two different embodiments of the connecting pieces.

FIG. 4 illustrates two different exemplary embodiments for the arrangement of connecting pieces A. The example on the right corresponds the previous figures: The connecting piece A of one of two cooling plates K is disposed between the two cooling plates K, while the second connecting piece A is located outside of the two cooling plates. This is not a problem, since the region of the connecting pieces A of primary element P does not need to be guided closely to the magnets of a secondary element and typically projects therefrom. The individual channels for coolant can have a larger cross-sectional area and, therefore, a lower resistance to flow than in the variant described below.

In the example shown on the left in FIG. 4, both connecting pieces A of two cooling plates K are disposed between the two cooling plates K. Therefore, primary element P has the same thickness both in connecting region B and in the region of coils C, which may be a constructional advantage in some applications. However, this also reduces the cross-sectional area available for the coolant channels.

The insertion of spacers D between cooling plates K will be described in more detail with reference to FIG. 5. These spacers D must maintain the distance between cooling plates K both under compressive and tensile strain. The special spacers D eliminate the need for screws at this position, which would protrude laterally from primary element P.

Openings K1 of cooling plates K are circular, at least in the respective outer plates K2 of cooling plates K, and intersect the edges of cooling plates K, so that the shape of a circular segment is obtained. Spacers D have the basic shape of a cylinder whose radius corresponds to the radius of the circular openings in the outer plates K2.

Figure 5:
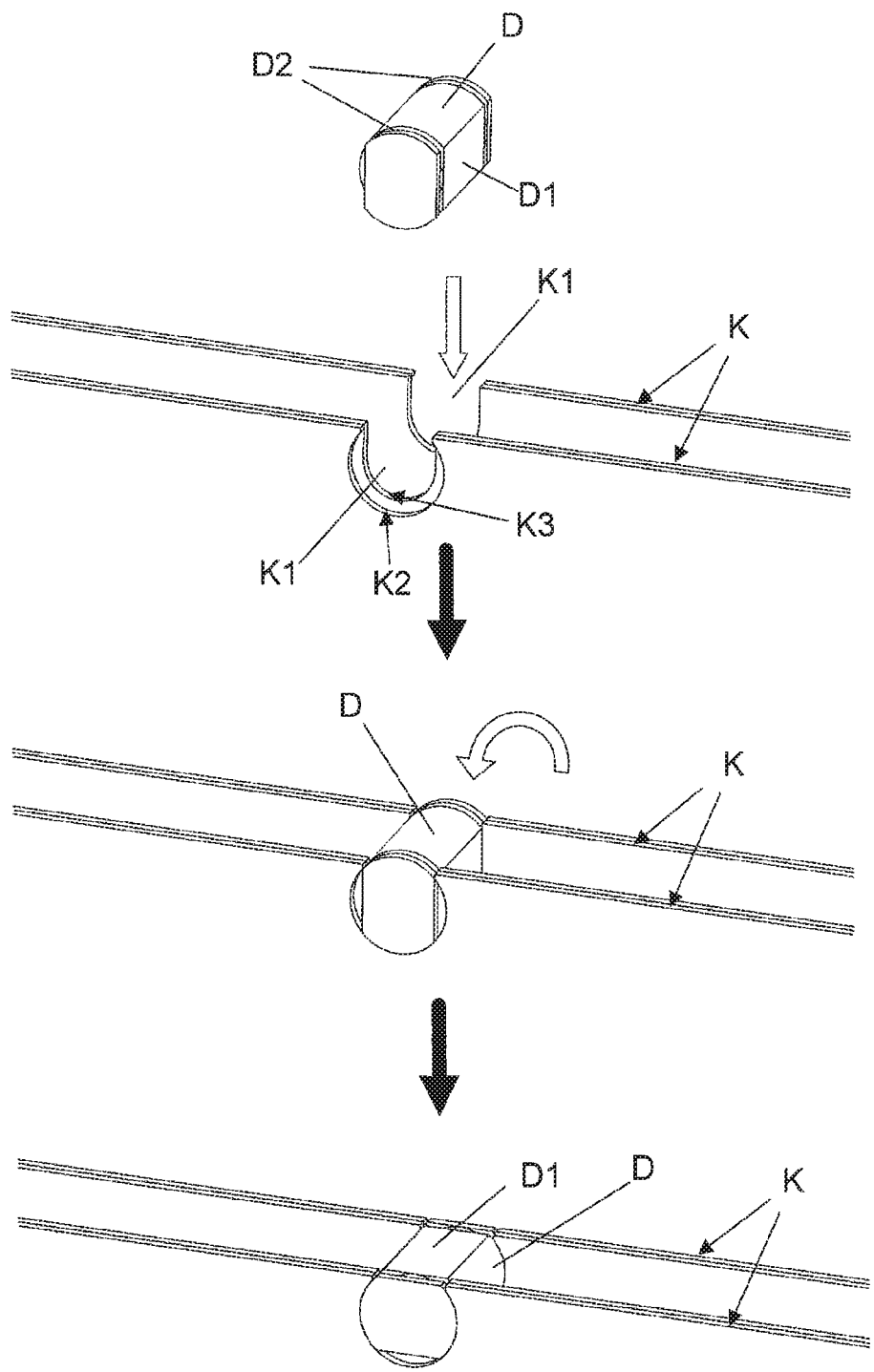
FIG. 5 illustrates the insertion of spacers between the cooling plates.

As shown in FIG. 5, the ends D2 of spacers D are configured to be insertable into openings K1. When the spacers are rotated 90 degrees, a flattened region D1 of spacers D is flush with the edges of cooling plates K, so that spacers D do not project therebeyond. Flattened region D1 corresponds to the cut-off circular segment of opening K1 in outer plate K2.

Moreover, openings K1 and ends D2 of spacers D are configured such that an interlocking connection is created between cooling plates K and spacers D after rotation through 90 degrees. In this position, spacers D are locked and cannot be pulled out of openings K1 or forced out laterally. To this end, as shown in the drawing, the two openings K1 in the two plates K2, K3 of a cooling plate K have different shapes. Specifically, the opening of the respective inner plate K3 has a narrower U shape which differs from the circular shape and corresponds to grooves at the ends D2 of spacers D and which creates an interlocking connection after rotation through 90 degrees. The grooves have a width corresponding to the thickness of inner plate K3 of cooling plate K.

Also, spacers D do not project perpendicularly beyond cooling plates K, which is advantageous because of their proximity to coils C and thus to the secondary element and its magnets.

Upon completion of the assembly of primary element P, the interior space around coils C is filled under vacuum with a potting compound having good thermal conductivity.

Figure 6:
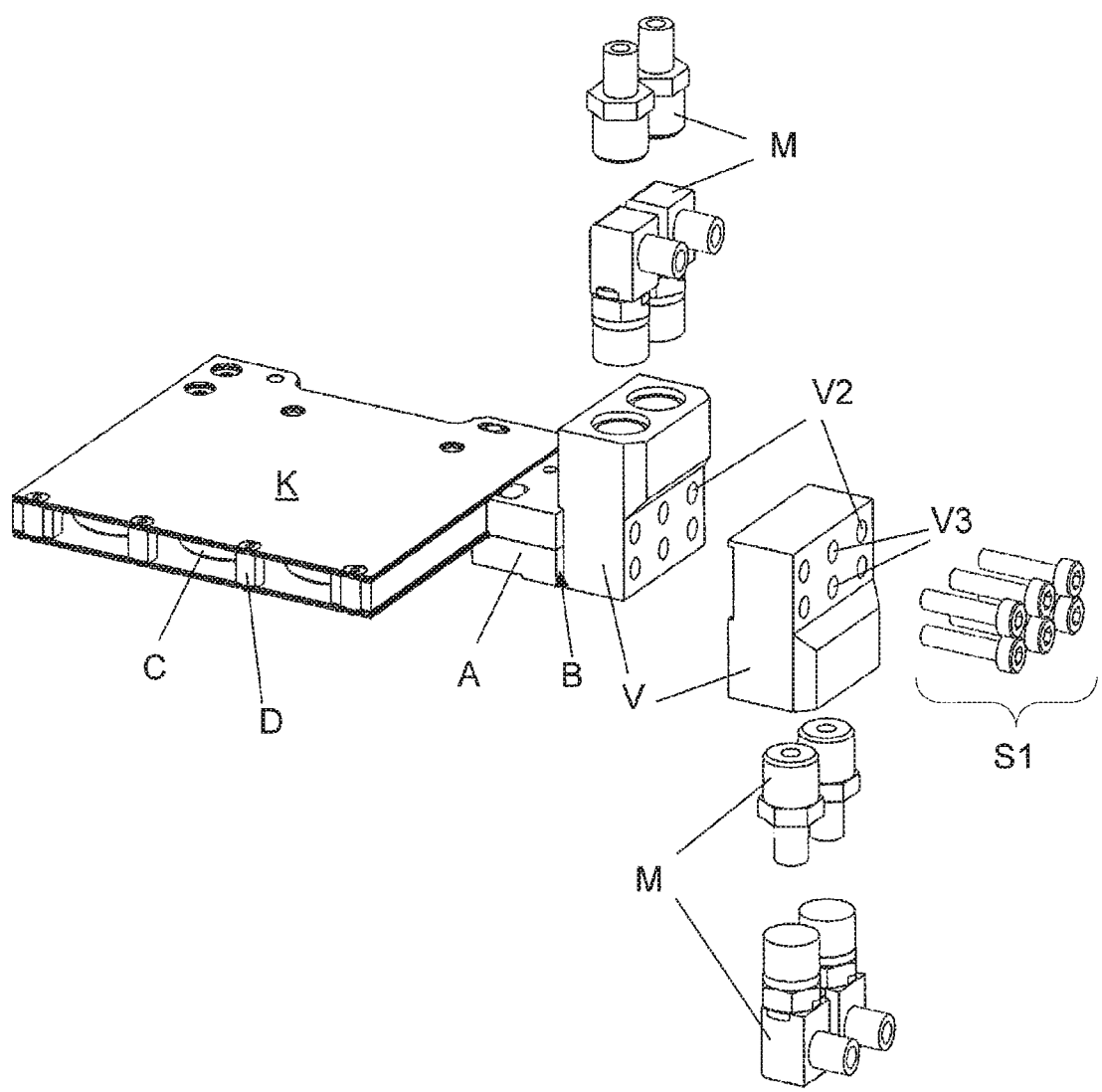
FIG. 6 shows different options for connecting the primary element to a coolant circuit.

Finally, FIG. 6 shows that distribution header V can be attached to connecting pieces A, i.e., to connecting region B, in either of two positions rotated 180 degrees apart. In conjunction with straight or angled coolant connectors M, many variants can be realized for the attachment of the cooling system, so that great flexibility is achieved with respect to the spatial configuration of the coolant supply. Distribution header V is also easy to remove, so that in the event of a leakage, repair can be easily accomplished, for example, by replacing sealing rings R.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A primary element of an ironless linear motor, the primary element comprising:
   cooling plates, each of the cooling plates being connected to a connecting piece extending in a region of an edge of the cooling plate, the connecting pieces being configured to supply coolant, the connecting pieces being located one above the other in a direction perpendicular to the cooling plates so as to form a common connecting region of the cooling plates at an end face of the primary element;
   a plurality of coils disposed between the cooling plates; and
   a coolant distribution header releasably attached to the connecting region,
   wherein the connecting pieces each have a recess, which alone or together with an opposite recess of an oppositely-disposed one of the connecting pieces, has a depth sufficient to accommodate one of the cooling plates.

2. The primary element as recited in claim 1, wherein the distribution header has a recess in which holes and coolant ports are arranged in such a way that the distribution header is attachable to the connecting pieces in two different orientations.

3. The primary element as recited in claim 1, wherein the distribution header is attached by screws to the connecting region of the connecting pieces.

4. The primary element as recited in claim 1, wherein each respective cooling plate is brazed to the respective connecting piece associated therewith.

5. The primary element as recited in claim 1, wherein the cooling plates are each comprised of two plates which are brazed together and have channels for the coolant.

6. The primary element as recited in claim 5, wherein the channels extend along identical paths in all of the cooling plates.

7. The primary element as recited in claim 1, wherein a distance between two of the cooling plates is based on a thickness of one of two of the connecting pieces which is disposed between the two cooling plates, wherein the other of the two connecting pieces is disposed outside of the two cooling plates.

8. The primary element as recited in claim 7, further comprising spacers disposed at an end of the primary element opposite the connecting region, the spacers maintaining each of the two cooling plates at the distance corresponding to the thickness of the two connecting pieces.

9. The primary element as recited in claim 8, wherein the spacers are cylindrical.

10. The primary element as recited in claim 9, wherein the cooling plates have openings into which the spacers are insertable and lockable by rotating the spacers 90 degrees about a cylinder axis.

11. The primary element as recited in claim 10, wherein edges of the openings of the cooling plates engage in recesses at ends of the spacers in such a way that, in a locked state, the spacers and the cooling plates are interlockingly connected together.

12. The primary element as recited in claim 11, wherein at least an outer one of the cooling plates is comprised of an inner plate and an outer plate, wherein the outer plate has a circular-segment-shaped opening, and the inner plate has a U-shaped opening.

13. The primary element as recited in claim 11, wherein, in the locked state, a flattened region of each of the spacers is flush with edges of the cooling plates.

14. The primary element as recited in claim 1, wherein a distance between two of the cooling plates is based on a thickness of two of the connecting pieces which are disposed adjacent one another between the two cooling plates.

15. The primary element as recited in claim 14, further comprising spacers disposed at an end of the primary element opposite the connecting region, the spacers maintaining each of the two cooling plates at the distance corresponding to the thickness of the two connecting pieces.

16. The primary element as recited in claim 15, wherein the spacers are cylindrical.

17. The primary element as recited in claim 16, wherein the cooling plates have openings into which the spacers are insertable and lockable by rotating the spacers 90 degrees about a cylinder axis.

18. The primary element as recited in claim 17, wherein edges of the openings of the cooling plates engage in recesses at ends of the spacers in such a way that, in a locked state, the spacers and the cooling plates are interlockingly connected together.

19. The primary element as recited in claim 18, wherein at least an outer one of the cooling plates is comprised of an inner plate and an outer plate, wherein the outer plate has a circular-segment-shaped opening, and the inner plate has a U-shaped opening.

20. The primary element as recited in claim 18, wherein, in the locked state, a flattened region of each of the spacers is flush with edges of the cooling plates.

21. A linear motor comprising:
   a primary element according to claim 1; and
   a secondary element having a track of magnets of alternating polarity.

* * * * *